United States Patent [19]

Freund, Jr. et al.

[11] 4,283,958
[45] Aug. 18, 1981

[54] MAGNETIC FLOWMETER HAVING AUTOMATIC RANGING

[75] Inventors: William R. Freund, Jr., Hatfield; John C. Grebe, Jr., Norristown, both of Pa.

[73] Assignee: Emerson Electric Co., St. Louis, Mo.

[21] Appl. No.: 82,766

[22] Filed: Oct. 9, 1979

[51] Int. Cl.³ .............................................. G01F 1/60
[52] U.S. Cl. .................................................. 73/861.12
[58] Field of Search ........... 73/861.12, 861.16, 861.17; 330/282

[56] References Cited

U.S. PATENT DOCUMENTS

| 3,184,966 | 5/1965 | Thornton et al. | 73/861.17 |
| 3,539,936 | 11/1970 | McGhee | 330/282 X |
| 4,132,957 | 1/1979 | Hekimian et al. | 330/282 X |

Primary Examiner—Charles A. Ruehl
Attorney, Agent, or Firm—Polster, Polster and Lucchesi

[57] ABSTRACT

The internal accuracy of a magnetic flowmeter signal processing chain is preserved throughout an extended flow range by means of an automatic ranging system which automatically multiplies the gain of an amplifier in the chain as the flow rate decreases, and simultaneously divides its output to produce an essentially continuous output signal. The automatic ranging system eliminates manual range setting and is not observable from outside the system in the steady state.

10 Claims, 1 Drawing Figure

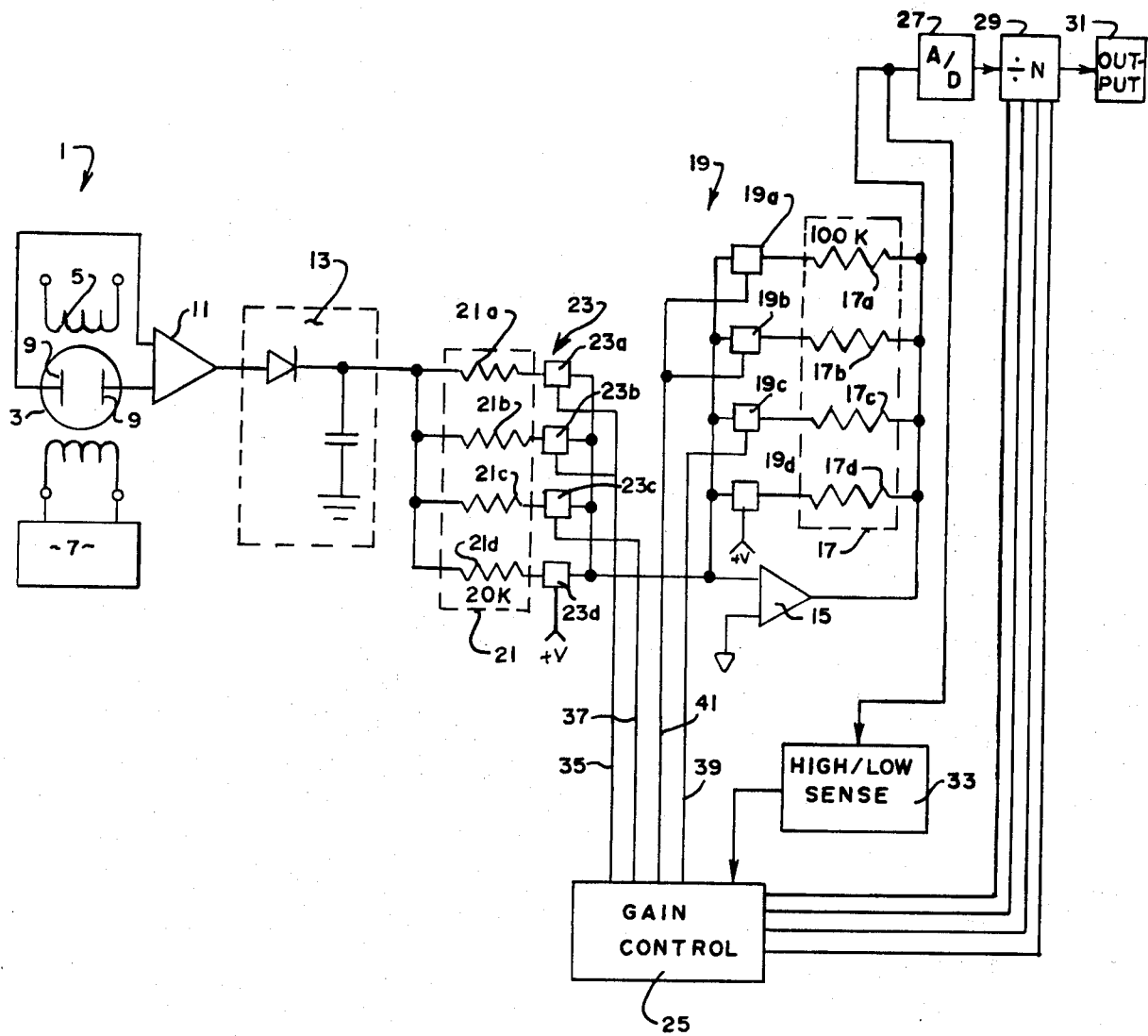

MAGNETIC FLOWMETER HAVING AUTOMATIC RANGING

BACKGROUND OF THE INVENTION

This invention relates to a signal processing system for a magnetic flowmeter, and in particular to such a system which automatically maintains the internal accuracy of the system over a wide range of flow rates, and in particular at low flow rates.

In a magnetic flowmeter system, the output of the meter is a voltage proportional to the rate of flow of a fluid flowing through the meter body. This signal is generally of rather low level, and is amplified by a signal processing system to provide an output signal. In presently known magnetic flowmeter systems, the accuracy of the signal processing system, in terms of percentage of flow, decreases dramatically as the flow rate decreases below, say, ten percent of full scale. To compensate for this effect, the signal processing system includes a manual "range" setting which permits the system to operate in a "normal" range for flow rates of between ten percent of full-scale and full-scale, and in a "low" range for flow rates below ten percent. This arrangement has a number of drawbacks. For example, it requires operating personnel to keep watch over the output of the system and make the appropriate change in setting when the flow rate reaches the critical setting. It does not maintain as high a degree of accuracy as desirable in either operating range. It requires calibration of both scales. It requires conversion of the displayed output of the system from one range into the units of the other range (e.g. dividing by ten).

SUMMARY OF THE INVENTION

One of the objects of this invention is to provide a magnetic flowmeter signal processing system which automatically maintains the accuracy of the output signal throughout an extended range without requiring any intervention from without the system.

Another object is to provide such a system which provides an output signal which varies continuously with the flow-dependent input signal.

Another object is to provide such a system which is capable of maintaining greater accuracy throughout an extended flow range than presently known systems.

Other objects will become apparent to those skilled in the art in the light of the following description.

In accordance with this invention, an automatic ranging system is provided for a magnetic flowmeter which includes a body adapted to be connected in a flow system for measuring the flow of a fluid therethrough, means for generating a magnetic field in the fluid flowing through the body, means for producing a flow-dependent signal dependent on the electric field generated in the fluid flowing through the magnetic field, and amplifier means for amplifying the flow-dependent signal to produce an amplified flow-dependent signal, and further signal processing means for receiving the amplified flow-dependent signal and producing an output signal dependent thereon, wherein the automatic ranging means comprises first means for increasing the gain of the amplifier means as the flow-dependent signal decreases and second means for producing a signal in the further signal processing means indicative of the increase in gain.

By making the second means decrease the magnitude of the output signal proportionally to the increase in the gain of the amplifier means, an output is produced which is substantially continuous with respect to the flow-dependent signal while preserving internal accuracy.

Preferably, the first means comprise means for sensing the magnitude of the amplified flow-dependent signal and maintaining the magnitude within a predetermined range over an extended range of values of the flow-dependent signal. Also preferably, the amplifier means comprise an operational amplifier and the first means comprise a plurality of resistors and means for switching the resistors into and out of circuit with the operational amplifier to vary its gain in steps.

Also preferably, the further signal processing means comprise means for producing a variable frequency signal dependent on the amplified flow-dependent signal and the second means comprise a digital divider circuit which varies the frequency of the variable frequency signal by integral steps.

Other aspects of the invention will be better understood with reference to the following description of the preferred embodiment.

BRIEF DESCRIPTION OF THE DRAWINGS

The FIGURE is a schematic diagram of a magnetic flowmeter system including the preferred embodiment of automatic ranging system of this invention.

DESCRIPTION OF THE PREFERRED EMBODIMENT

Referring now to the drawings, reference numeral 1 indicates a magnetic flowmeter system incorporating the present invention. The flowmeter system 1 includes a flow tube 3, a pair of oppositely disposed electromagnetic coils 5 energized from a source 7, and a pair of electrodes 9 which sense a voltage generated by the flow of an electrically conductive fluid through the magnetic field produced by the coils 5 across the tube 3. The voltage across the electrodes 9 is amplified by a preamplifier 11. All of these components may be conventional.

The output of the preamplifier 11 is rectified by the rectifier 13 and is amplified by an amplifier 5. The amplifier 15 preferably includes an operational amplifier and a feedback amplifier. The input to the operational amplifier is periodically zeroed, and the feedback amplifier is switched into circuit between the operation amplifier output and its input reference, to reduce the output offset of the operational amplifier to a fixed minimum value. Such circuits are well known in the art. A suitable circuit is described in our co-pending application Ser. No. 82,762, filed concurrently herewith. The gain of the operational amplifier 15 is controlled by the ratio of the feedback resistance to the input resistance. These resistance values are set by a network 17 of feedback resistors 17a, 17b, 17c and 17d, controlled by a bank 19 of semiconductor switches 19a, 19b, 19c and 19d respectively, and by a network 21 of input resistors 21a, 21b, 21c and 21d, controlled by a second bank 23 of semiconductor switches 23a, 23b, 23c and 23d respectively. The resistor networks 17 and 21 may be precision ratio matched resistors, such as a 0.1 percent matched resistor package sold by Beckman Instruments, Inc. as its number 699-3-R100K-D and 699-3-R20K-D respectively. The semiconductor switches 19 and 23 may be integrated circuits such as Motorola MC14066BCP. The control pins of the switches 19 and 23 are connected to a gain control circuit 25. The output of the amplifier 15 is applied to an analog to digital converter 27. Numerous suitable converters are known. In the preferred embodiment, the converter 27 is a voltage to frequency converter. The output of the analog to frequency converter 27 is connected through a divide-by-N circuit 29 to an output 31 for display or control. The value of N is controlled by the gain control 25 as described hereinafter. Suitable divide-by-N and output circuits are well known in the art.

The output of the amplifier 15 is also fed to a high-low sense circuit 33. The sense circuit 33 compares the output of the amplifier 15 with a high and a low reference voltage and signals the gain control 25 when the output of the amplifier 15 is out-of-range. Suitable comparators are well known in the art.

In the operation of the system, in the no-flow condition all of the input resistors are connected in parallel to provide minimum resistance in the input path to the amplifier 15. This is accomplished by providing gating signals through a first control line 35 and second control line 37 to switches 23a, 23b and 23c of the switch network 23. The fourth switch 23d is connected to a voltage source and is always closed. Three switches 19a, 19b, and 19c controlling current flow through parallel feedback resistors 17a, 17b and 17c, respectively, are kept open by the gain control circuit 25 in the no-flow condition. The fourth switch 19d is connected to a voltage source and is always closed. The feedback resistor network 17, therefore, provides maximum resistance, and the gain of the amplifier 15 is at its maximum value of twenty.

As flow through the flow tube 3 increases, the magnitude of the output signal from the amplifier 15 increases until it reaches the high threshold of the high-low sense circuit 33. By way of example, this threshold voltage may correspond to an average velocity of about two feet per second. At this point, the high-low sense circuit 33 signals the gain control 25 to decrease the gain of the amplifier 15. The gain control 25 thereupon removes the control signal from line 35, thereby opening the switches 23a and 23b and doubling the input resistance to the amplifier 15. The gain of the amplifier 15 is therefore halved to ten.

When the average velocity of the flow through the meter 3 doubles, the output of the amplifier 15 again exceeds the upper threshold of the high-low sense circuit 33. This circuit then signals the gain control to lower the gain by removing the control signal from line 37, thereby opening switch 23c and doubling the input resistance and halving the gain of the amplifier 15.

In like manner, as the flow rate again doubles, a signal is applied through line 39 to halve the effective feedback resistance. As the flow rate again doubles and approaches maximum flow, a signal through control line 41 closes switches 19a and 19b and again halves the effective feedback resistance to reduce the gain of the amplifier is to a value of 1.25.

As the flow rate decreases to a point that the low threshold value of the high-low sense circuit 33 is reached, the signals applied to the control lines are sequentially reversed, starting with line 41, to double the gain of the amplifier 15. It will be apparent that the high and low theshold values are preferably set such that the high-low sense device 33 provides hysteresis and prevents oscillation of the gain control.

It will be seen that the portion of the system of this invention ahead of the analog to digital converter 27 in the signal processing chain provides at least two major advantages. First, the output of the amplifier 15 is maintained at a sufficiently high value to minimize any residual offset error not compensated by automatic zeroing. Second, the input to the analog to digital converter is maintained within a relatively narrow range, so that the converter 27 may operate in its range of optimum accuracy.

The output of the analog to digital converter is divided by an integer N which is also set by the gain control circuits. It will be apparent that with the gain of the amplifier 15 set at its minimum value, the most convenient value of N is one. As the gain of the amplifier 15 is doubled, the value of N is doubled, so that at maximum gain the value of N is sixteen. The signal provided to the output 31 is therefore continuous with the input signal provided by the preamplifier 11, hence with flow rate. The automatic ranging system of the invention is not observable from outside the signal processing chain, except, possibly, for an extremely brief transient at the switching points. Such transients are easily suppressed at the output.

Numerous variations in the automatic ranging system of the present invention will occur to those skilled in the art in light of the foregoing disclosure. Merely by way of example, the values of the matched resistors 17 and 21 may be different from those of the preferred embodiment, and more or fewer levels of amplification may be utilized. As previously noted, various low offset or automatically zeroed amplifiers may be used for the amplifier 15. Other analog to digital converters may be used, such as those having a digital word output rather than a frequency output, although the frequency output is presently preferred for its ease of transmission and ease of utilization by existing output devices. These variations are merely illustrative.

We claim:

1. In a magnetic flowmeter comprising a body adapted to be connected in a flow system for measuring the flow of a fluid therethrough, means for generating a magnetic field in said fluid flowing through said body, means for producing a flow-dependent signal dependent on the electric field generated in said fluid flowing through said magnetic field, and amplifier means for amplifying said flow-dependent signal to produce an amplified flow-dependent signal, and further signal processing means for receiving said amplified flow-dependent signal and producing an output signal dependent thereon, the improvement comprising automatic ranging means comprising first means for increasing the gain of said amplifier means as said flow-dependent signal decreases and second means for producing a signal in said further signal processing means indicative of said increase in gain.

2. The improvement of claim 1 wherein said second means comprise means for decreasing the magnitude of said output signal proportionally to the increase in said gain of said amplifier means, thereby producing an output which is substantially continuous with respect to said flow-dependent signal while preserving internal accuracy.

3. The improvement of claim 2 wherein said first means comprise means for sensing the magnitude of said amplified flow-dependent signal and maintaining said magnitude within a predetermined range over an extended range of values of said flow-dependent signal.

4. The improvement of claim 3 wherein said amplifier means comprise an operational amplifier and said first means comprise a plurality of resistors and means for switching said resistors into and out of circuit with said operational amplifier to vary the gain thereof in steps.

5. The improvement of claim 4 wherein said further signal processing means comprise an analog to digital converter, and said second means comprise means for digitally dividing the output of said converter by a number dependent on the gain of said amplifier means.

6. The improvement of claim 5 wherein said analog to digital converter comprises means for producing a variable frequency signal dependent on said amplified flow-dependent signal and said second means comprise means for dividing said variable frequency signal by an integer.

7. The improvement of claim 2 wherein said further signal processing means comprise an analog to digital converter, and said second means comprise means for digitally dividing the output of said converter by a number dependent on the gain of said amplifier means.

8. The improvement of claim 7 wherein said analog to digital converter comprises means for producing a variable frequency signal dependent on said amplified flow-dependent signal and said second means comprise means for dividing said variable frequency signal by an integer.

9. The improvement of claim 1 wherein said first means comprise means for sensing the magnitude of said amplified flow-dependent signal and maintaining said magnitude within a predetermined range over an extended range of values of said flow-dependent signal.

10. The improvement of claim 9 wherein said amplifier means comprise an operational amplifier and said first means comprise a plurality of resistors and means for switching said resistors into and out of circuit with said operational amplifier to vary the gain thereof in steps.

* * * * *